(12) United States Patent
Harrow et al.

(10) Patent No.: US 8,994,663 B2
(45) Date of Patent: Mar. 31, 2015

(54) AUTHENTICATION AT A SELF-SERVICE TERMINAL

(75) Inventors: Charles Harrow, Dundee (GB); Jonathan S. Black, Dundee (GB); Grant C. Paton, Dundee (GB)

(73) Assignee: NCR Corporation, Duluth, GA (US)

( * ) Notice: Subject to any disclaimer, the term of this patent is extended or adjusted under 35 U.S.C. 154(b) by 962 days.

(21) Appl. No.: 12/873,761

(22) Filed: Sep. 1, 2010

(65) Prior Publication Data
US 2012/0050179 A1 Mar. 1, 2012

(51) Int. Cl.
*G06F 3/0488* (2013.01)
*G06F 21/83* (2013.01)
*G06F 21/36* (2013.01)

(52) U.S. Cl.
CPC ............ *G06F 21/36* (2013.01); *G06F 3/04883* (2013.01); *G06F 21/83* (2013.01)
USPC .......................................................... 345/173

(58) Field of Classification Search
USPC .................................... 345/173; 713/182–184
See application file for complete search history.

(56) References Cited

U.S. PATENT DOCUMENTS

| | | | |
|---|---|---|---|
| 2002/0109677 A1* | 8/2002 | Taylor ........................... | 345/173 |
| 2003/0132293 A1* | 7/2003 | Fitch et al. .................... | 235/383 |
| 2006/0217985 A1* | 9/2006 | Noguchi et al. .............. | 704/270 |
| 2007/0157028 A1* | 7/2007 | Lott ............................... | 713/182 |
| 2009/0278807 A1* | 11/2009 | Hu ................................. | 345/173 |

* cited by examiner

Primary Examiner — Ariel Balaoing
(74) Attorney, Agent, or Firm — Joseph P. Mehrle (57) ABSTRACT

A method and apparatus for authenticating a customer at a self-service terminal are described. The method comprises: receiving a stroke delineated by the customer; matching the delineated stroke to a defined shape; and providing feedback to the customer to indicate that the delineated stroke has been matched to a defined shape. These steps are repeated until a complete sequence of defined shapes has been entered. The method further comprises converting the defined shape sequence to a sequence of characters; encrypting the sequence of characters; and transmitting the encrypted sequence of characters to a host for authentication.

15 Claims, 5 Drawing Sheets

AUTHENTICATING AN ATM CUSTOMER, CONT.

Fig 4B

CREATING AUTHENTICATION BLOCK

AUTHENTICATION AT A SELF-SERVICE TERMINAL

FIELD OF INVENTION

The present invention relates to improvements in or relating to authentication at a self-service terminal. In particular, though not exclusively, the invention may relate to authentication at an automated teller machine (ATM).

BACKGROUND OF INVENTION

Bank account holders typically authenticate themselves at an ATM by inserting a card into a card slot (or by presenting some other identification token) and entering a personal identification number (PIN) on an encrypting keypad (implemented either as a physical keypad or as a screen rendered on a touch sensitive display).

Customers who have a visual impairment may not be able to use a touch sensitive display to enter their PIN because they cannot feel for a registration point (such as a raised bar on the "5" digit on a conventional encrypting PINpad). In addition, there is no tactile feedback from touching a touch sensitive surface. This makes using a touch sensitive display unreliable for those with some visual impairment, and almost impossible for those with no vision.

Furthermore, some bank customers are not numerate and have difficulty in remembering their PIN.

It would be desirable to provide an authentication mechanism that is as secure as conventional PIN, but that can be used reliably by those customers with visual impairments.

SUMMARY OF INVENTION

Accordingly, the invention generally provides methods, systems, apparatus, and software for authentication at a self-service terminal based on strokes delineated by a customer.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a method of authenticating a customer at a self-service terminal, the method comprising:

receiving a stroke delineated by the customer;
matching the delineated stroke to a defined shape;
providing feedback to the customer to indicate that the delineated stroke has been matched to a defined shape;
repeating the receiving, matching, and providing feedback steps until a complete sequence of defined shapes has been entered;
converting the defined shape sequence to a sequence of characters;
encrypting the sequence of characters; and
transmitting the encrypted sequence of characters to a host for authentication.

The stroke may be delineated by the customer's finger or by a stylus.

Matching the delineated stroke to a defined shape may be implemented by a driver associated with a touch sensitive surface, where the driver outputs a code indicative of the matched shape.

The feedback may be provided aurally (for example, by a beep, or a recorded voice) and/or visually (for example, by presenting a star on a customer display for each matched stroke). The customer display may be a touch sensitive display on which the customer delineates the stroke, and/or a customer display separate from a touch sensitive surface on which the customer delineates the stroke.

The complete sequence of defined shapes may comprise a predefined number of shapes. Alternatively, the complete sequence of defined shapes may comprise a number of shapes entered prior to the customer selecting an option indicating that the authentication sequence has been completed. The option may be selected via a touch sensitive surface on which the customer delineates the stroke, or by pressing a physical button in proximity to the touch sensitive surface on which the customer delineates the stroke.

Converting the defined shape sequence to a sequence of characters may comprise accessing a mapping table. The mapping table may map each defined shape to one or more characters. The value of the one or more characters may be the same irrespective of where the defined shape occurs in the sequence of defined shapes. Alternatively, value of the one or more characters may be different depending on the position of the defined shape in the sequence of defined shapes.

Multiple defined shapes may be mapped to the same character or characters.

Encrypting the sequence of characters may comprise the sub-step of: adding buffer characters to create a code sequence having a predefined length.

Encrypting the sequence of characters may comprise the further sub-step of: combining the code sequence with an account code (optionally buffered with additional characters to create an account code having a predefined length, which may be identical to the code sequence predefined length) to create a block code; and encrypting the block code.

The step of combining the code sequence with the account code may be implemented by using a Boolean function, such as an eXclusive OR (XOR) function.

Transmitting the encrypted sequence of characters to a host for authentication may comprise transmitting the encrypted sequence of characters to a controller within the self-service terminal.

Transmitting the encrypted sequence of characters to a host for authentication may further comprise the sub-step of transmitting the encrypted sequence of characters from the controller to a host remote from the self-service terminal. Alternatively, the host authentication may be performed by the controller in the self-service terminal or by a module accessed by the controller, such as an integrated circuit card reader for reading an integrated circuit card presented by the customer.

A stroke delineated by a customer may comprise a single sequence of points delineated by a customer between engaging with the touch sensitive surface and disengaging with the touch sensitive surface. Alternatively or additionally, a stroke delineated by a customer may comprise multiple sequences of points delineated by a customer, each sequence of points following the previous sequence of points within a defined time period. For example, a customer may delineate a first sequence of points, then within 500 milliseconds of lifting his/her finger from the first sequence of points, may engage again with the touch sensitive surface and delineate a second sequence of points. The two sequences of points would be handled as a single composite stroke.

According to a second aspect there is provided an encrypting touch sensitive unit for authenticating a customer, the unit comprising:

a touch sensitive surface operable to receive strokes delineated by the customer;

a touch sensitive surface driver operable to match the delineated strokes to defined shapes; and an encryption application operable to: (i) provide a feedback signal that can be used to inform the customer each time a delineated stroke has been matched to a defined shape, (ii) convert a sequence of defined shapes received from the customer to a sequence of characters, (iii) encrypt the sequence of characters, and (iv) transmit the encrypted sequence of characters to a host for authentication.

The encrypting touch sensitive unit may further comprise a customer display. The customer display may be in registration with the touch sensitive surface. In such embodiments (where the customer display is in registration with the touch sensitive surface, the touch sensitive surface is transparent.

The encrypting touch sensitive unit may include a secure memory and a secure cryptographic processor operable to access encryption keys stored in the secure memory.

The encrypting touch sensitive unit may comprise a sealed unit including tamper responsive circuitry to detect attempted tampering with the unit and to delete encryption keys stored in the secure memory in response to detecting attempted tampering therewith.

According to a third aspect there is provided a self-service terminal including an encrypting touch sensitive unit according to the second aspect.

The self-service terminal may comprise an automated teller machine (ATM), an information kiosk, a financial services centre, a bill payment kiosk, a lottery kiosk, a postal services machine, a check-in and/or check-out terminal such as those used in the retail, hotel, car rental, gaming, healthcare, and airline industries, or the like.

According to a fourth aspect there is provided a network of self-service terminals according to the third aspect, where the network further comprises an authentication host operable to compare an encrypted sequence of characters received from one of the self-service terminals with a stored sequence of characters associated with an account provided with the encrypted sequence of characters.

The network of self-service terminals may comprise an ATM network.

For clarity and simplicity of description, not all combinations of elements provided in the aspects recited above have been set forth expressly. Notwithstanding this, the skilled person will directly and unambiguously recognize that unless it is not technically possible, or it is explicitly stated to the contrary, the consistory clauses referring to one aspect are intended to apply mutatis mutandis as optional features of every other aspect to which those consistory clauses could possibly relate.

These and other aspects will be apparent from the following specific description, given by way of example, with reference to the accompanying drawings.

DETAILED DESCRIPTION

Figure 1:
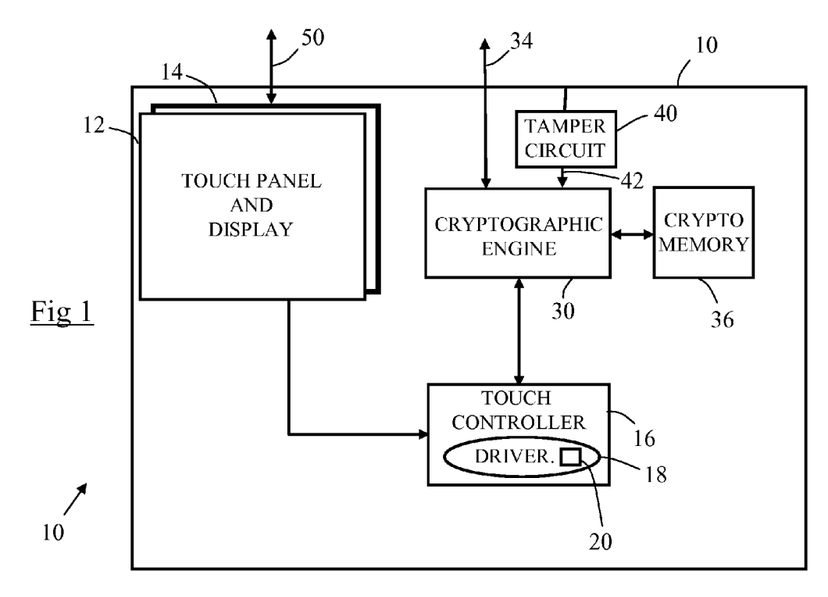
FIG. 1 is a block diagram of an encrypting touch sensitive unit according to one embodiment of the present invention.

Reference is first made to FIG. 1, which is a block diagram of an encrypting touch sensitive unit 10 according to one embodiment of the present invention. The unit 10 comprises: a transparent touch sensitive surface 12 in registration with a display 14. The touch sensitive surface is operable to receive strokes delineated by a customer either by the customer's finger or a stylus.

The unit 10 further comprises a touch sensitive surface controller 16 including driver code 18 for detecting strokes delineated by the customer and for matching these delineated strokes to defined shapes. The driver code 18 compares each delineated stroke received from the touch sensitive surface 12 with a library of defined shapes stored in a shape library 20 to locate the best match. If the driver code 18 locates a best match that exceeds a minimum match threshold then that delineated stroke is assigned to that defined shape. In other words, the delineated stroke is recognized as being that defined shape.

The shape library 20 can be updated if new defined shapes are to be added to the library of defined shapes.

Each defined shape has a unique character string (also stored in the shape library 20 as a mapping table) so that the touch controller 16 outputs the associated character string to a cryptographic engine 30 once a delineated stroke has been recognized.

In this embodiment the unique character string comprises a decimal number.

Each time a delineated stroke is recognized by the touch controller 16, the cryptographic engine 30 sends a signal to an external terminal controller (not shown) on communication bus 34. This allows an external application to provide feedback to the customer to indicate that a stroke has been recognized by the touch controller 16.

The cryptographic engine 30 is also coupled to a secure memory 36 that stores encryption keys (not shown).

The unit 10 comprises a secure assembled unit that is designed to detect any attempt to access components therein or to tamper therewith. The unit 10 includes a tamper responsive mechanism 40 in the form of a circuit. The circuit 40 is coupled to various conventional detection mechanisms (such as conducting meshes and microswitches) for detecting tampering with the unit 10, and also to the cryptographic processor 30. If the circuit 40 detects any attempted disassembly (for example, removal of fixing screws holding the assembly together) or other tampering with the unit 10 (for example, tapping into the communication bus 34, milling of the unit's casing, or the like), then the circuit 40 transmits a tamper detect signal to the cryptographic processor 30 via a tamper line 42.

The cryptographic processor 30 deletes the contents of the secure memory 36 in response to this tamper detect signal on the tamper line 42.

The display 14 (but not the transparent touch sensitive surface 12) is also coupled to an external application (not shown in FIG. 1) by a conventional display bus (such as a DVI (digital visual interface) bus) 50.

Figure 2:
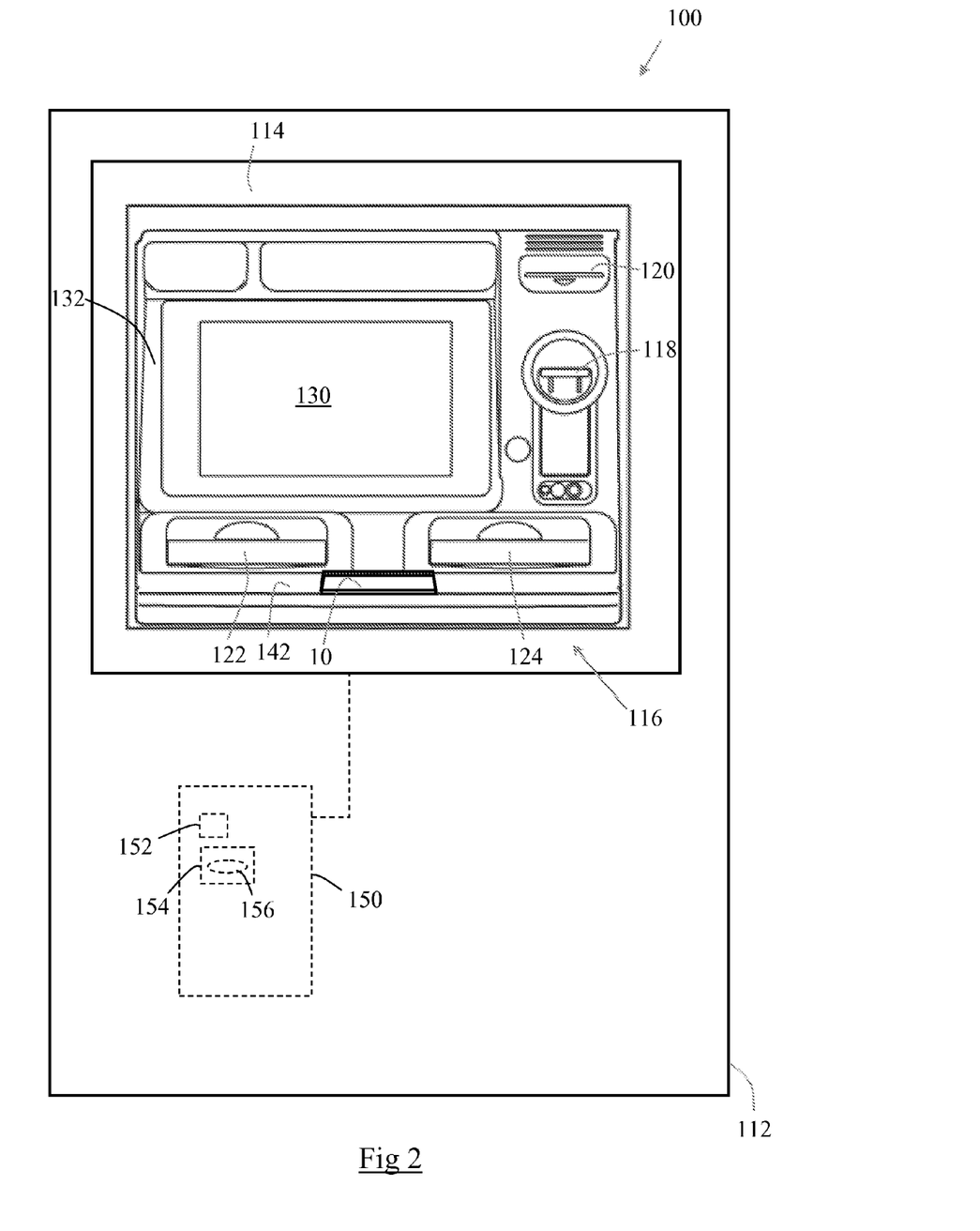
FIG. 2 is a pictorial front view of a self-service terminal including the encrypting touch sensitive unit of FIG. 1.

Reference will now also be made to FIG. 2, which is a pictorial front view of a self-service terminal 100 (in the form of an ATM) including the encrypting touch sensitive unit 10.

The ATM 100 comprises a cabinet 112 to which is mounted a plastic fascia 114.

The fascia 114 provides part of a user interface 116 to allow a customer to interact with the ATM 100. In particular, the fascia 114 has apertures (or slots) aligning with internal devices (not shown).

The fascia 114 defines: a card reader slot 118; a receipt printer slot 120; a deposit slot 122 (closed by a shutter when not being used for depositing media items); and a dispenser slot 124 (closed by a shutter when not being used for dispensing banknotes).

A main customer display 130 is mounted on an upright portion 132 of the fascia 114.

The encrypting touch sensitive unit 10 is mounted on a flat shelf portion 142.

In this embodiment, the main customer display 130 comprises a fifteen inch (15") display, and the customer display 14 comprises a seven point two inch (7.2") display.

The modules in the ATM 100 are controlled by a PC core controller module 150 (shown in broken line in FIG. 2). The PC core controller 150 includes many conventional hardware computer devices, such as a motherboard, a display adapter, serial ports, a disk drive, an Ethernet controller, and the like.

These conventional computer devices are not shown in detail. However, a controller processor 152 and associated memory 154 are illustrated in FIG. 2, in broken line. An ATM application program 156 is executed by the processor 152 in the memory 154. Those of skill in the art will know that the processor 152 and memory 154 are coupled to the conventional computer devices listed above (and other conventional computer devices not listed specifically).

Figure 3:
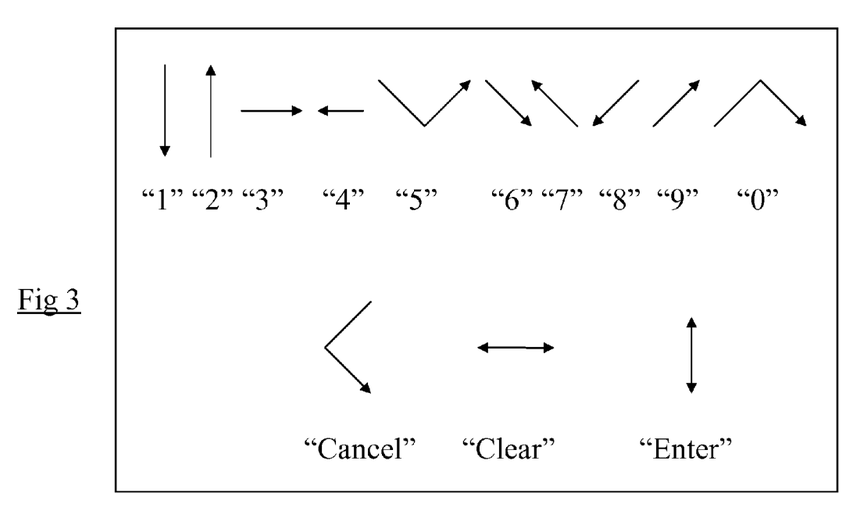
FIG. 3 is a pictorial diagram illustrating some defined shapes that can be recognized by the encrypting touch sensitive unit of FIG. 1.

Reference will now also be made to FIG. 3, which is a pictorial diagram illustrating some defined shapes (and their associated meanings) that can be recognized by the encrypting touch sensitive unit 10. These shapes are stored in the shape library 20.

The shapes are independent of location on the touch sensitive surface 12, so that a customer may start the shape at any point on the touch sensitive surface 12, provided there is enough space to complete the shape.

In FIG. 3, a single headed arrow indicates that the customer places his/her finger (or stylus) at the end opposite the arrow head and moves to the arrow head. For example, the numeral "1" is delineated by the customer starting at one point on the touch sensitive surface 12 and moving his/her finger downwards in a straight line.

The shapes are independent of scale, so that one customer may delineate a short vertical line starting from the top and moving downwards, covering only a third of the height of the touch sensitive surface 12; whereas, another customer may delineate an extended vertical line covering the entire height of the touch sensitive surface 12, but both shapes will be recognized as the numeral "1".

In addition to ten numerals (from "0" through "9"), there are defined shapes for three functions: "Cancel", "Clear", and "Enter". The ten numerals have a unique one digit character string equal to their value. For example, numeral "1" has a character string of "1". However, the three functions ("Cancel", "Clear", and "Enter") have unique character strings equal to "12", "14, and "16" respectively. These one digit and two digit character strings are also stored in the shape library 20.

In FIG. 3, a double headed arrow (for example, for the shapes corresponding to "Clear" and "Enter") indicates that the customer places his/her finger (or stylus) at either end, moves to the opposite end, then back to the end he/she started at. In other words, the customer retraces the line he/she first delineated.

The operation of the encrypting touch sensitive unit 10 will now be described with reference to FIG. 4, which is a flowchart 200 illustrating steps involved in authenticating a customer at the ATM 100.

Initially, the customer inserts his/her bank card into the card reader slot 118, which receives the card (step 202). The ATM application program 156 reads card details from this card (step 204), including the customer's account number.

The ATM application program 156 then transmits the customer's account number to the encrypting touch sensitive unit 10 via the communication bus 34 (step 206).

The ATM application program 156 presents a screen on the main customer display 130 inviting the customer to enter his/her authentication sequence (step 208) via the touch sensitive surface 12. The ATM application program 156 may also provide a voice output via a loudspeaker (not shown) or private audio socket (not shown) inviting the customer to enter his/her authentication sequence.

The ATM application program 156 also presents a screen on the display 14 presenting a canvas on which the customer can delineate his/her authentication sequence (step 210).

The customer then delineates the first stroke in his/her authentication sequence on the transparent touch sensitive surface 12. In this example, the first stroke is a vertical line starting at a lower part of the surface 12 and rising vertically, that is, the numeral "2" in FIG. 3. In this example, the customer has a four stroke authentication sequence.

The touch sensitive surface controller 16 detects this stroke (step 212), then compares this detected stroke with defined shapes stored in the shape library 20 in an attempt to recognize the delineated stroke (step 214). Each comparison produces a match parameter, which indicates how close a match the delineated stroke is to a defined shape.

If the touch sensitive surface controller 16 cannot match the detected stroke to one of the defined shapes in the shape library 20 within an acceptance criterion then the touch sensitive surface controller 16 informs the cryptographic engine 30 that the stroke could not be matched, which in turn informs the ATM application program 156 (via communication bus 34) that the stroke could not be matched (step 216).

The ATM application program 156 then presents a screen on the main customer display 130, and a screen on the display 12, both indicating that the delineated stroke was not recognized and inviting the customer to re-enter the stroke (step 218). The ATM application program 156 may also provide some audible instructions inviting the customer to re-enter the stroke.

If the touch sensitive surface controller 16 can match the detected stroke to one of the defined shapes in the shape library 20 within an acceptance criterion then the detected stroke is assigned to that defined shape (step 220). In this embodiment, the acceptance criterion comprises the match parameter exceeding a minimum threshold (such as an eighty percent match). In this example, the customer's vertical stroke rising up from a lower part of the surface 12 is recognized as a defined shape (corresponding to numeral "2").

The touch sensitive surface controller 16 retrieves from the shape library 20 the character string ("2") associated with this recognized shape (step 222).

The touch sensitive surface controller 16 provides this character string (associated with the recognized shape) to the cryptographic engine 30 (step 224). The cryptographic engine 30 informs the ATM application program 156 (via communication bus 34) that the stroke has been recognized (step 225), but does not provide the ATM application 156 with the character string. The cryptographic engine 30 also buffers this character string in the secure memory 36 until a complete authentication sequence has been entered by the customer.

The ATM application program 156 then presents a screen on the main customer display 130, and a screen on the display 12, both indicating that the delineated stroke was recognized (for example, by presenting a star symbol followed by three dashes to indicate that the first stroke has been recognized) (step 226). The ATM application program 156 may also provide some audible feedback to the customer.

The touch sensitive surface controller 16 ascertains if the authentication sequence is complete (step 228); that is, if all of the strokes in the customer's authentication sequence have been entered by the customer and recognized. In this embodiment, the authentication sequence is complete when the customer delineates a stroke recognized as the "Enter" function (a vertical line retraced along its length).

If the authentication sequence is not complete, then the flow reverts to step 210, where a canvas is presented on the display 12 to invite the customer to enter the next stroke.

If the authentication sequence is complete (in this embodiment this is detected by the touch sensitive surface controller 16 recognizing that the "Enter" function has been delineated by the customer), then the cryptographic engine 30 retrieves the buffered character strings that comprise the authentication sequence from the secure memory 36 (step 230).

The cryptographic engine 30 then accesses the account number received in step 206 (step 232), and creates an authentication block (step 234) using the account number and the buffered character strings.

Figure 5:
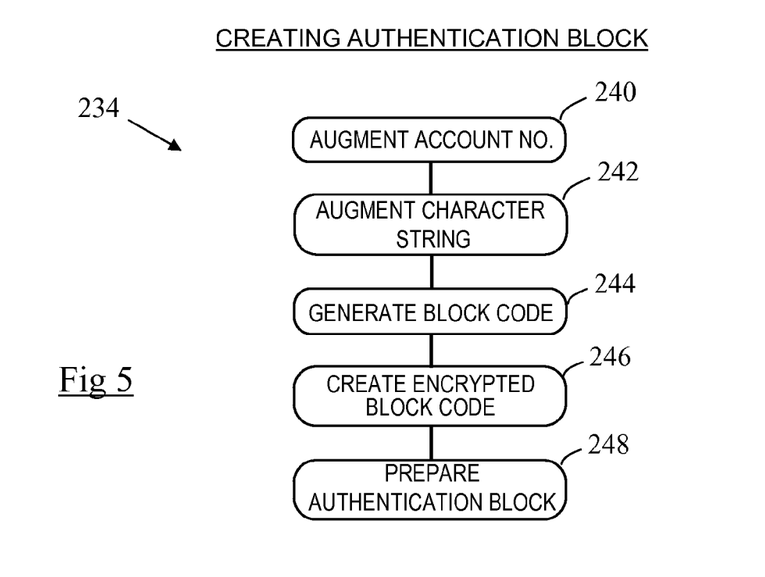
FIG. 5 is a flowchart illustrating sub-steps involved in one of the steps of the process of authenticating a customer in FIGS. 4A and 4B.

Reference will now be made to FIG. 5, which is a flowchart illustrating the steps involved in creating the authentication block; that is, the sub-steps of step 234.

In this embodiment, the authentication block is compatible with existing PINblock standards (in particular, ISO 9564-1) and is created as follows.

The cryptographic engine 30 first takes the account number and then adds random numbers to the end of the account number until the length of the augmented account number is twelve digits (step 240).

The cryptographic engine 30 then takes the buffered character strings and appends random numbers until an augmented character string is created comprising twelve digits (step 242).

The cryptographic engine 30 then applies an eXclusive OR Boolean function to the augmented account number and the augmented character string to generate a twelve digit block code (step 244).

The cryptographic engine 30 then encrypts the XOR block code using one or more encryption keys stored in the secure memory 36 to create an encrypted block code (step 246).

The cryptographic engine 30 then prepares a message comprising a leading (format) digit indicating the format of the message (in this embodiment, the leading digit is "3"), a length digit indicating the length of the PIN (in this embodiment the PIN length is four digits), the encrypted block code, and the account number (the message is referred to herein as the authentication block) (step 248). The format digit, the length digit, and the account number in the authentication block are all provided in plain text to enable the authentication block to be routed to the correct authorization server for "not on us" transactions.

Figure 4A:
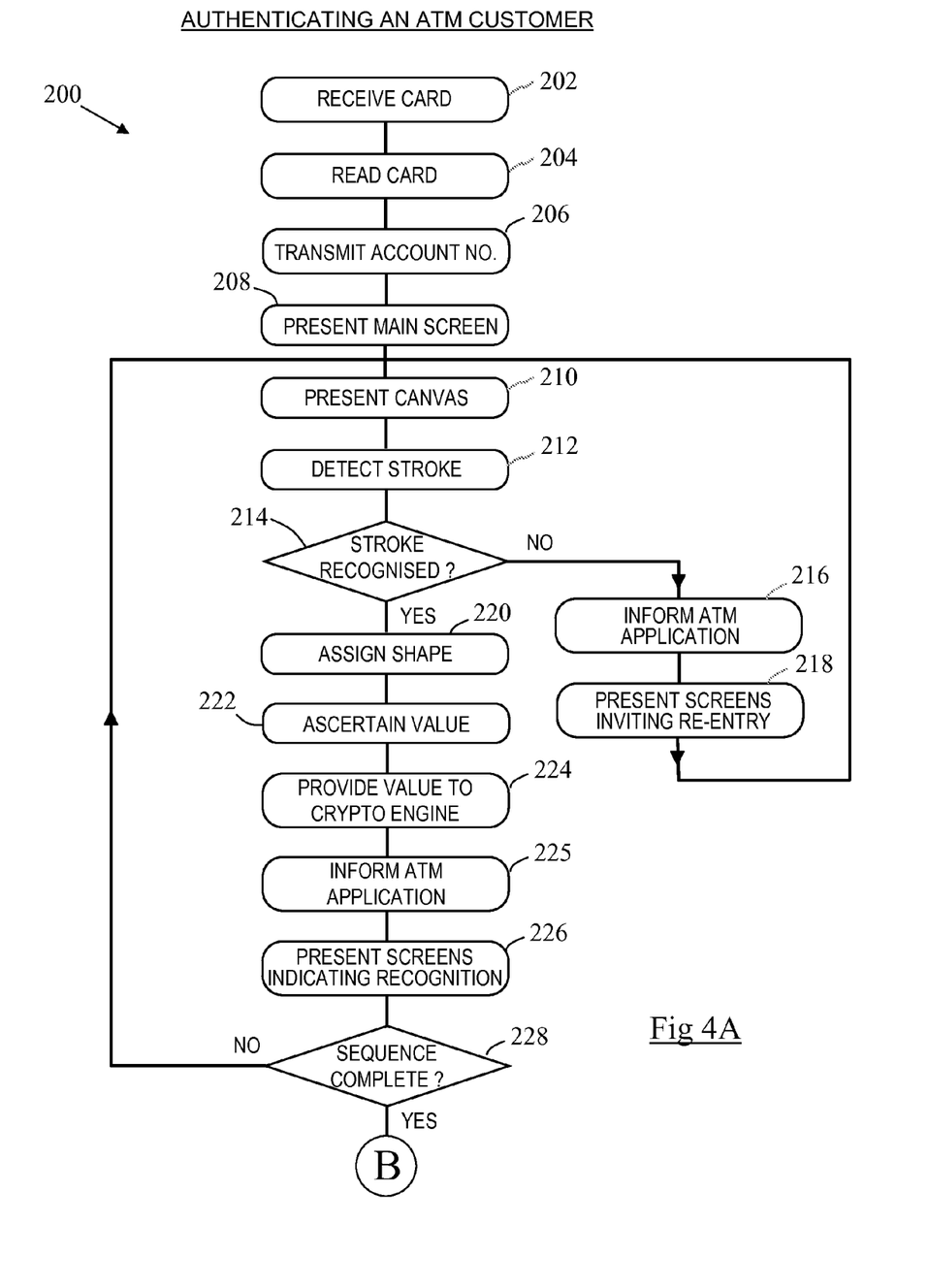
FIGS. 4A and 4B comprise a flowchart (split over two pages for clarity) illustrating steps involved in authenticating a customer at the self-service terminal of FIG. 2 using the encrypting touch sensitive unit of FIG. 1.
Figure 4B:
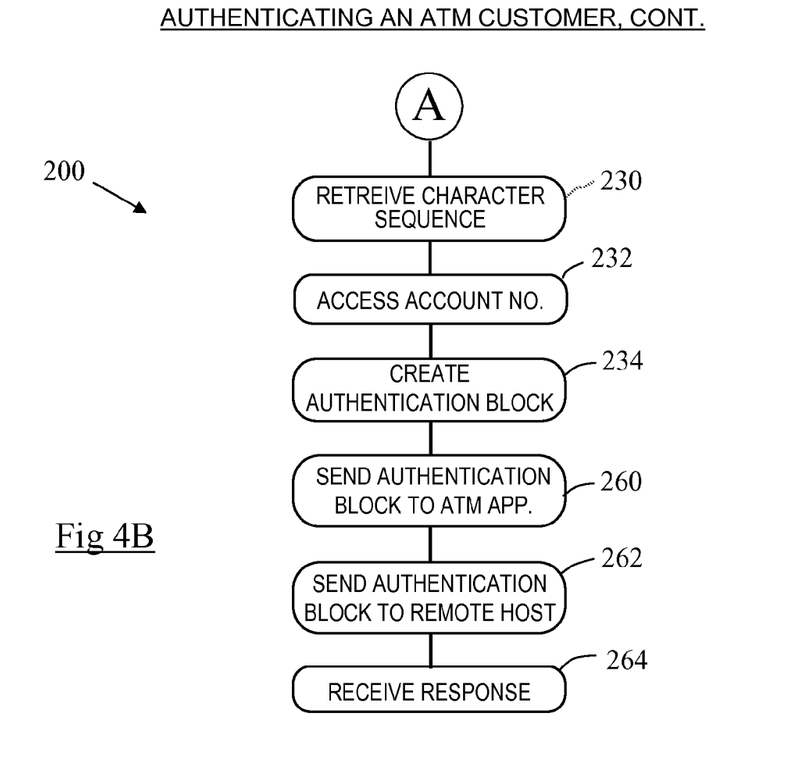

Returning again to step 234 in FIGS. 4A and 4B, the next step in the process 200 is to transmit the authentication block (which includes the encrypted block code) to the ATM application program 156 (step 260).

Figure 6:
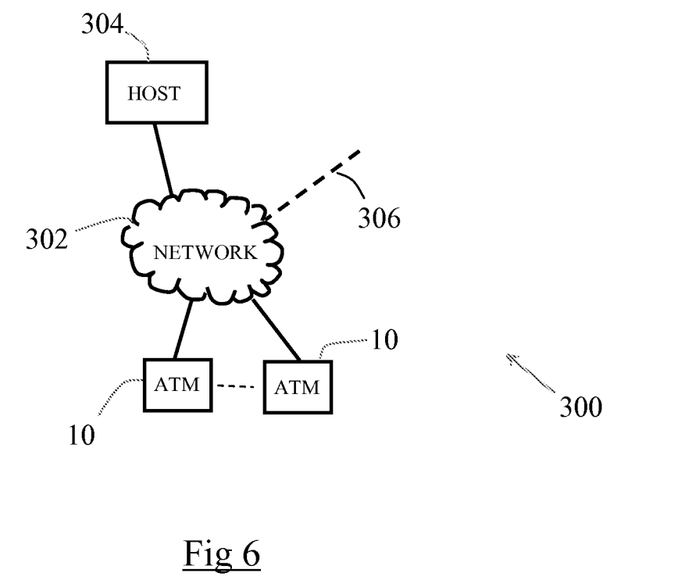
FIG. 6 is a block diagram illustrating a self-service terminal network including the self-service terminal of FIG. 2.

Reference will now also be made to FIG. 6, which is a block diagram illustrating a self-service terminal network 300 in the form of an ATM network.

The ATM network 300 comprises a plurality of ATMs (each identical to ATM 10), each coupled to an interchange network 302 having an associated authorization server 304. For simplicity of description only one ATM network 300 is illustrated in FIG. 6, but in practical embodiments, the ATM network 300 would be linked to another similar ATM network (illustrated by broken line 306), so that a bank customer can use an ATM network that is not operated by his/her bank (referred to as a "not on us" transaction).

Returning again to FIG. 4B, the ATM application program 156 in turn transmits the authentication block (together with a requested transaction, which has not been described herein because it is a conventional transaction) to the interchange network 302, which routes the authentication block to the authorization server 304 (a remote host) based on the plain text customer account number within the authentication block.

The authorization server 304 decrypts the encrypted block code and ascertains (in a conventional manner) if the character sequence is correct for that account number.

The authorization server 304 also verifies that there are sufficient funds (if relevant) for the requested transaction.

The authorization server 304 then responds to the ATM application program 156 (via the interchange network 302), which receives this response (step 264). The response will either approve or disapprove the requested transaction.

The transaction then proceeds in a conventional manner.

It will now be appreciated that this embodiment enables a customer (such as a visually impaired customer) to enter an authentication sequence based on strokes delineated on a touch sensitive surface, and the ATM handles the requested transaction in a conventional manner in a similar way as if a PIN had been entered. The ATM 10 may also allow a customer to enter a traditional PIN using a screen presenting a numeric PINpad, if the customer prefers this mode of authentication. The ATM therefore allows different modes of authentication (stroke delineation mode and numeric keypad mode) but handles these modes of authentication using the same, conventional ATM network.

The shapes illustrated in FIG. 3 are merely examples of shapes that may be used. Some operating systems, such as Windows (trade mark) Vista (trade mark) currently support a library of recognizable gestures, such as a triangle, a square, a circle, a check, and the like. See, for example, the list provided at http://msdn.microsoft.com/en-us/library/ms704830(vs.85).aspx. These strokes could be used in other embodiments.

Various modifications may be made to the above described embodiment within the scope of the invention, for example, in other embodiments, the defined shapes may differ from those described above.

In other embodiments a customer may create his/her own defined shape. Self-service terminals may need to be updated to identify a customer-defined shape and its associated character string. Alternatively, a customer may store custom-defined shapes and their associated character strings on an identification token (such as an integrated circuit card), and the self-service terminal may upload the customer defined shapes and characters strings when the customer presents his/her token at the start of a transaction.

In other embodiments, the character string associated with each defined shape may comprise multiple characters, for example two hexadecimal characters, three binary digits, four decimal characters, or the like.

In other embodiments, multiple different defined shapes may each have the same character string; for example a triangle and a square may each be associated with a character string of "1". Although this would not make the authentication sequence any more secure than by having only one defined shape per character string, a customer may find it easier to remember, or to delineate, some defined shapes rather than other defined shapes.

In other embodiments, the authentication sequence may be completed automatically when the final stroke in the authentication sequence has been recognized, without having to select an "Enter" function.

In other embodiments, the self-service terminal may comprise a check-out terminal, or some other non-ATM terminal.

The steps of the methods described herein may be carried out in any suitable order, or simultaneously where appropriate. The methods described herein may be performed by software in machine readable form on a tangible storage medium or as a propagating signal.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

Unless otherwise indicated by the context, the terms "a" and "an" are used herein to denote at least one of the elements, integers, steps, features, operations, or components mentioned thereafter, but do not exclude additional elements, integers, steps, features, operations, or components.

The presence of broadening words and phrases such as "one or more," "at least," "but not limited to" or other similar phrases in some instances does not mean, and should not be construed as meaning, that the narrower case is intended or required in instances where such broadening phrases are not used.

What is claimed is:

1. A method of authenticating a customer at a self-service terminal, the method comprising:
    receiving a stroke delineated by the customer;
    matching the delineated stroke to a defined shape;
    providing feedback to the customer to indicate that the delineated stroke has been matched to a defined shape;
    repeating the receiving, matching, and providing feedback steps until a complete sequence of defined shapes has been entered, the complete sequence having the stroke and other strokes and at least one stroke in the complete sequence identified as a clear function;
    converting the defined shape sequence to a sequence of characters;
    encrypting the sequence of characters; and
    transmitting the encrypted sequence of characters to a host for authentication.

2. A method according to claim 1, wherein matching the delineated stroke to a defined shape is implemented by a driver associated with a touch sensitive surface, where the driver outputs a code indicative of the matched shape.

3. A method according to claim 1, wherein the feedback is also provided visually.

4. A method according to claim 1, wherein the complete sequence of defined shapes comprises a predefined number of shapes.

5. A method according to claim 1, wherein converting the defined shape sequence to a sequence of characters comprises accessing a mapping table.

6. A method according to claim 1, wherein encrypting the sequence of characters comprises the sub-step of: adding buffer characters to create a code sequence having a predefined length.

7. A method according to claim 6, wherein encrypting the sequence of characters comprises the further sub-step of:
    combining the code sequence with an account code to create a block code; and
    encrypting the block code.

8. A method according to claim 6, wherein the step of combining the code sequence with the account code is implemented using a Boolean XOR function.

9. A method according to claim 1, wherein transmitting the encrypted sequence of characters to a host for authentication comprises:
    transmitting the encrypted sequence of characters to a controller within the self-service terminal.

10. A method according to claim 9, wherein transmitting the encrypted sequence of characters to a host for authentication further comprises the sub-step of transmitting the encrypted sequence of characters from the controller to a host remote from the self-service terminal.

11. An encrypting touch sensitive unit for authenticating a customer, the unit comprising:
    a touch sensitive surface operable to receive strokes delineated by the customer;
    a touch sensitive surface driver operable to match the delineated strokes to defined shapes; and
    an encryption application operable to: (i) provide a feedback signal that can be used to inform the customer each time a delineated stroke has been matched to a defined shape (ii) convert a sequence of defined shapes received from the customer to a sequence of characters and identify at least one sequence a clear function, (iii) encrypt the sequence of characters, and (iv) transmit the encrypted sequence of characters to a host for authentication.

12. An encrypting touch sensitive unit according to claim 11, further comprising a customer display.

13. An encrypting touch sensitive unit according to claim 11, further comprising a secure memory and a secure cryptographic processor operable to access encryption keys stored in the secure memory.

14. An encrypting touch sensitive unit according to claim 11, further comprising a sealed unit including tamper responsive circuitry to detect attempted tampering with the unit and to delete encryption keys stored in the secure memory in response to detecting attempted tampering therewith.

15. A self-service terminal including an encrypting touch sensitive unit according to claim 11.

* * * * *